No. 763,849. PATENTED JUNE 28, 1904.
E. W. BRYCE.
MANUFACTURE OF GLASS LAMPS, &c.
APPLICATION FILED APR. 15, 1904.
NO MODEL.
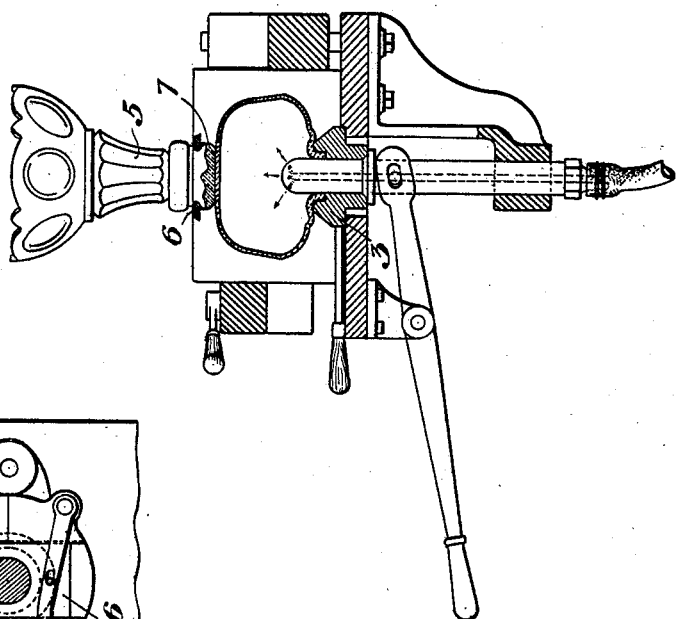
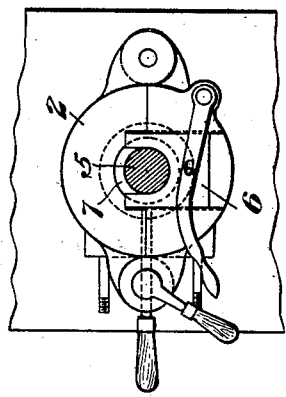
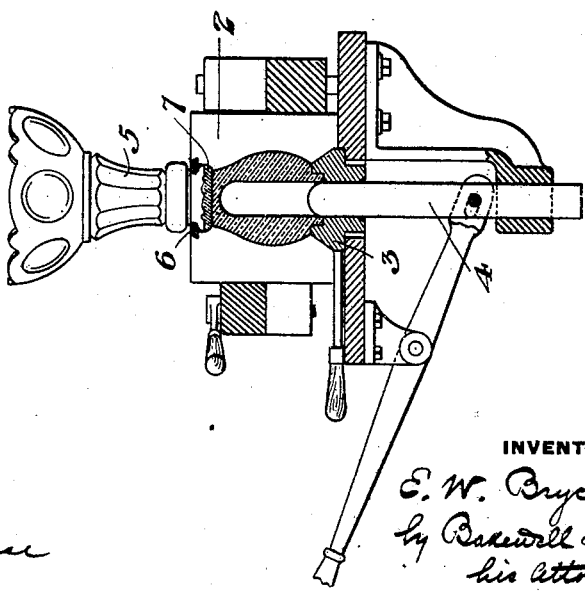
WITNESSES
INVENTOR
E. W. Bryce
by Bakewell & Byrnes
his Attorneys No. 763,849. Patented June 28, 1904.

UNITED STATES PATENT OFFICE.

EDWIN W. BRYCE, OF PITTSBURG, PENNSYLVANIA, ASSIGNOR TO UNITED STATES GLASS COMPANY, OF PITTSBURG, PENNSYLVANIA, A CORPORATION OF PENNSYLVANIA.

MANUFACTURE OF GLASS LAMPS, &c.

SPECIFICATION forming part of Letters Patent No. 763,849, dated June 28, 1904.

Application filed April 15, 1904. Serial No. 203,253. (No model.)

*To all whom it may concern:*

Be it known that I, EDWIN W. BRYCE, of Pittsburg, Allegheny county, Pennsylvania, have invented a new and useful Improvement in the Manufacture of Glass Lamps and other Articles, of which the following is a full, clear, and exact description, reference being had to the accompanying drawings, forming part of this specification, in which—

Figure 1 is a side elevation, partly in section, showing the blank with the foot attached. Fig. 2 is a plan view of the same. Fig. 3 is a view similar to Fig. 1, showing the blow-mold in which the article is finished.

The purpose of my invention is to provide means for forming glass lamps and other articles having feet or stems of glass in such way as to produce the article with minimum cost and labor. In the practice of the invention I form a glass foot or stem and then having applied it to the end of a press-mold which has been filled with glass I press a hollow blank for the bowl in the mold and simultaneously weld it to the stem. I then blow the blank into the shape of a finished bowl while it is still attached to the stem.

In the accompanying drawings, in which I show apparatus suitable for the practice of my invention, 2 is a sectional press-mold for the blank, having at its base a neck-ring 3 and a vertically-movable plunger 4 and having its upper end open for receiving the glass and applying the stem or foot.

In the practice of the invention a gathering of glass is placed in the cavity of the mold 2. A glass foot or stem 5 is then placed with the end to be attached to the bowl at the open upper end of the mold, and it is held down by a sliding catch 6 or other suitable device, the forked end of which embraces the stem 5 and bears against a rib or collar 7 thereon. The plunger 4 is then raised into the mold-cavity and displaces the glass upwardly against the end of the stem, to which it immediately welds and attaches itself and also forms a cavity in the glass, thus making a bowl-blank firmly attached to the stem. The plunger is then retracted, during which operation the glass of the blank is upheld by its attachment to the stem. The mold is then opened, and by means of the neck-ring 3 the blank and foot are removed from the mold 2 and taken to a blow-mold, the matrix of which is of the size and shape required for the bowl, and with a suitable supply of compressed air the blank is blown therein into finished form, its end being still held by the neck-ring in which it is formed in the mold 2.

The advantages of the invention are that it reduces largely the skill required in making glass lamps with stems, and as the glass when attached to the stem has all the initial heat of the blank it produces a much better weld than heretofore.

Within the scope of the invention as defined in the claims the apparatus may be modified, since

What I claim is—

1. The method herein described of making glass articles, which consists in forming a blank and simultaneously attaching it to a glass stem or piece and then blowing the attached blank; substantially as described.

2. The method herein described of making glass articles, which consists in forming a blank in inverted position and simultaneously attaching it to a glass stem or piece and then blowing the attached blank; substantially as described.

In testimony whereof I have hereunto set my hand.

EDWIN W. BRYCE.

Witnesses:
 DANIEL C. RYELEY,
 THOMAS W. BAKEWELL.